R. J. ALDEN

CARTRIDGE

Nov. 17, 1931.

Re. 18,252

Original Filed March 11, 1926

INVENTOR.
Reginald J. Alden
BY Chapin + Neal
ATTORNEYS.

Reissued Nov. 17, 1931

Re. 18,252

UNITED STATES PATENT OFFICE

REGINALD J. ALDEN, OF SPRINGFIELD, MASSACHUSETTS

CARTRIDGE

Original No. 1,741,900, dated December 31, 1929, Serial No. 93,931, filed March 11, 1926. Application for reissue filed August 31, 1931. Serial No. 560,443.

This invention relates to small arms ammunition and more particularly to a cartridge having a projectile consisting of a soft solid.

One object of the invention is to provide improvements in a cartridge of this type which utilizes certain properties embodied in the projectile selected.

Further objects will become apparent from the following description and accompanying drawings, in which.

Figure 1:
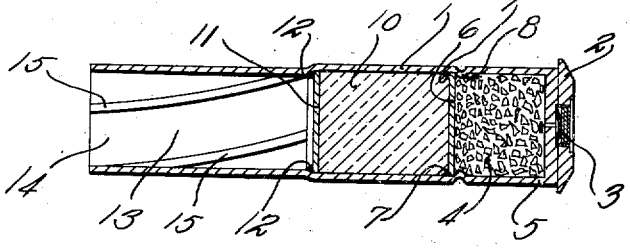
Fig. 1 is a longitudinal cross section of my improved cartridge.
Figure 2:
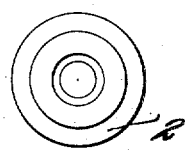
Fig. 2 is an end view of the head of the cartridge.

In the drawings, 1 represents a cylindrical or conical shell or case comprising the cartridge proper preferably made of suitable metal such as cartridge brass or the like. The case 1 is provided with a head 2 in which is located the primer 3. The charge 4 is packed within the case 1 adjacent the head 2 which is provided with the usual vent 5. The charge 4 consists of suitable powders such as propelling charges and is preferably confined within the case 1 by means of a wad 6. In the present embodiment, the wad 6 consists of a thin piece of paper, the edge of which is covered with shellac or collodion or the like around its edges to provide a protective seal 7 for the charge 4.

Figure 4:
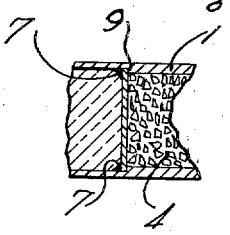
Fig. 4 is a longitudinal cross section of a portion of the cartridge showing a modification of the construction of same.
Figure 3:
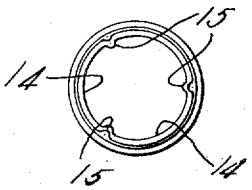
Fig. 3 is an end view of the mouth of same.

In order to provide a seat for the wad 6, when the cartridge is assembled, I preferably provide a shoulder 8 on the inside of the case against which the edges of wad 6 contact. In Fig. 1, I have shown the shoulder 8 as being formed by providing an annular groove on the outside of the case 1 at the proper point, but the shoulder may be formed in any other manner, such as is shown in Fig. 4 where the shoulder 9 is provided by a slight decrease in the inside diameter of the case.

The projectile 10 is next inserted and is confined within the case 1 by a wad 11 similar to wad 6 and is preferably covered with shellac or collodion or the like around its edges to provide a protective seal 12 similar to the seal 7 on wad 6.

The projectile 10 consists of a soft solid of non-metallic substance and consists of a composition which has the property of remaining in a soft solid state at all temperatures below the temperature of the human body, but which preferably liquefies at body temperature or thereabouts for a purpose which will be later described. The composition of the projectile 10 is an important feature of my invention and the ingredients and proportion of same have a wide range depending upon the uses and results desired to be obtained. For the present, I desire to provide a projectile which when fired from a short range gun or firearm will, upon impact against a person, disable the person temporarily but not permanently wound or kill. For this purpose, I have found that a projectile composed of glycerine and stearic acid in suitable quantities gives the desired results although any other suitable composition of non-metallic materials may be used. With the proper amounts of the ingredients, a composition of this nature will remain in a soft solid state at temperatures below that of the human body; while upon impact against a person, the projectile will liquefy whereby the projectile will spread and cover a considerable portion of the person hit. With the ingredients named, such an impact will cause a temporary wound or disability to the person hit. A further humanitarian feature may be added to the composition of the projectile wherein the wound caused by the impact will become antiseptic at its inception. Thus a therapeutic agent such as neo-silver or chlorine, iodine or some equivalent substance may be included in the composition which will give this desired result.

The projectile 10 is mainly confined within the casing 1 between the wads 6 and 11 and the wall of the case, and I also provide a space 13 by an extension of the case 1 for a considerable distance beyond the projectile.

For the distance of this space, I preferably reduce the inside diameter of the case by reducing the diameter of the case itself for this distance by approximately one fifteenth thousandth of an inch and provide rifling lands 13 and grooves 14 on the inside wall thereof. The reduced forward portion of the case is thus made slightly smaller than the projectile 10 so that the latter, when ejected, will fill up tightly the space 13 and the rifling grooves and thus confine the propelling gases behind the projectile to obtain their full force and effect when fired. In other words, the forward end of the case 1 functions as would the barrel of the usual fire arm.

In the present embodiment, I form the lands on the inside of the space 12 by spirally grooving the case at this end thereof. This method of providing the rifling is an extremely simple and inexpensive way over the usual method of milling or machining same, besides allowing the case to be made of the usual thin cartridge brass which would be difficult to mill or machine with any degree of efficiency.

Figure 5:
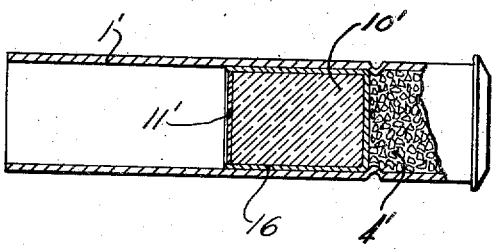
Fig. 5 is a longitudinal cross section showing a modification of my invention.

In Fig. 5 I have shown a modification which consists in encasing the non-metallic soft solid 10′ in a protective covering 16 of fragile material, preferably paper, and loaded into the shell 1′. The covering 16 is of suitable thickness so as to assist in confining the projectile 10′ to its normal shape during the flight thereof and it will protect the projectile 10′ from absorbing any powder or gas which has a tendency to slip by the inner end of the projectile upon the firing of the propelling charge 4′. The paper covering 16 is also preferably of such character that upon impact against a target it will break up and not itself penetrate.

In the use of a projectile with such a protective covering, it is preferable to load same in an unrifled shell as shown, and also one having an unreduced portion. It will be apparent that the inner end of the covering 16 serves as a wad for the powder charge 4′, while the usual wad 11′ may be provided at the outer end of the projectile. The covering 16 is thus preferably made cup shaped although it may be constructed in capsule form in which case the wad 11′ is omitted.

What I claim is:

1. A cartridge comprising a shell provided with a primer and an explosive propelling charge, a projectile comprising a mass of glycerine and stearic acid mainly confined within said shell, said mass adapted to be ejected in a soft solid state by said charge.

2. A cartridge comprising a shell provided with a primer and an explosive propelling charge, a projectile comprising a mass of non-metallic substance mainly confined within said shell and impregnated with a therapeutic agent, said mass adapted to be ejected in a soft solid state by said charge.

3. A cartridge, comprising, a shell provided with a primer and an explosive propelling charge, and a projectile composed essentially of glycerine and stearic acid.

4. A cartridge, comprising, a shell provided with a primer and an explosive propelling charge, and a projectile compose essentially of a non-metallic soft solid mass combined with a therapeutic agent.

5. A cartridge, comprising a shell provided with a primer, an explosive propelling charge and an entirely non-metallic projectile adapted to serve as a missile when the cartridge is fired, said projectile composed essentially of a soft solid mass having the property of remaining in a soft solid state at temperatures below that of the human body and of spreading out into mushroom form upon impact with the body hit, so as to penetrate only a short distance into the tissues of the body, said projectile mass being also adapted to be liquefied by the heat of impact and heat of the human body with which it contacts.

6. A cartridge, comprising a shell provided with a primer, an explosive propelling charge and an entirely non-metallic projectile adapted to serve as a missile when the cartridge is fired, said projectile composed essentially of a soft solid mass having the property of remaining in a soft solid state at temperatures below that of the human body and adapted upon contact with the human body to be liquefied from the heat of said body.

In testimony whereof I have affixed my signature.

REGINALD J. ALDEN.